United States Patent
Murayama et al.

(10) Patent No.: US 8,520,199 B2
(45) Date of Patent: Aug. 27, 2013

(54) METHOD FOR MEASURING OPTICAL INPUT POWER BY AVALANCHE PHOTODIODE

(75) Inventors: Tetsu Murayama, Yokohama (JP); Moriyasu Ichino, Yokohama (JP)

(73) Assignee: Sumitomo Electric Device Innovations, Inc., Kanagawa (JP)

( * ) Notice: Subject to any disclaimer, the term of this patent is extended or adjusted under 35 U.S.C. 154(b) by 0 days.

(21) Appl. No.: 13/118,896

(22) Filed: May 31, 2011

(65) Prior Publication Data
US 2011/0292381 A1 Dec. 1, 2011

(30) Foreign Application Priority Data
May 31, 2010 (JP) .................................. 2010-124822

(51) Int. Cl.
*G01J 1/42* (2006.01)
(52) U.S. Cl.
USPC ........................................................ 356/218
(58) Field of Classification Search
USPC ........................................................ 356/218
See application file for complete search history.

(56) References Cited

U.S. PATENT DOCUMENTS

| | | | |
|---|---|---|---|
| 6,188,059 B1 | 2/2001 | Nishiyama et al. | |
| 6,570,149 B2 * | 5/2003 | Maruyama et al. | 250/238 |
| 6,654,215 B2 * | 11/2003 | Green | 361/56 |
| 7,761,013 B2 | 7/2010 | Futami | |

FOREIGN PATENT DOCUMENTS

| | | |
|---|---|---|
| JP | 62-85832 | 4/1987 |
| JP | 2002-202254 | 7/2002 |
| JP | 2004-289206 | 10/2004 |

OTHER PUBLICATIONS

Translation of Japanese patent application No. 2002-202254, filing date Jul. 19, 2002.*
Machine translation of JP 2002-202254.
Notification of Reasons of Rejection issued Feb. 14, 2012 for Japanese patent application No. 2010-124822 w/ English language translation.

* cited by examiner

*Primary Examiner* — Tu Nguyen
(74) *Attorney, Agent, or Firm* — Smith, Gambrell & Russell, LLP

(57) ABSTRACT

A method to monitor an output of an APD is disclosed. The method includes steps of, (a) measuring dark currents of the APD at several temperatures in advance to a practical operation of the APD, (b) measuring an output current of the APD by illuminating the APD practically at a measured temperature, (c) estimating a dark current at the measured temperature from measured dark currents, and (d) subtracting the estimated dark current from the output current.

5 Claims, 6 Drawing Sheets

Fig. 11

METHOD FOR MEASURING OPTICAL INPUT POWER BY AVALANCHE PHOTODIODE

BACKGROUND OF THE INVENTION

1. Field of the Invention

The present invention relates to a method to measure optical input power by an avalanche photodiode (hereafter denoted as APD)

2. Related Prior Art

The United States patent, the U.S. Pat. No. 6,188,059, has disclosed a light receiving circuit for an APD including two stages of the current mirror circuit to monitor a photocurrent generated by the APD. This circuit may detect the photocurrent of the APD without affecting a bias condition of the APED by the two stages of the current mirror circuit. The Japanese Patent Application published as JP-2004-289206A has disclosed a circuit for monitoring a light intensity using an APD. Obtaining a characteristic regarding to the multiplication factor M of the APD, which depends on the optical input power, in advance to the practical application, the monitored value by the APD shows a linear dependence on the optical input power. The United States patent, the U.S. Pat. No. 7,761,013, has disclosed a circuit for an APD. The circuit disclosed therein may select one of circuits depending on the magnitude of the photocurrent by the APD, which may widen the dynamic range of the monitoring.

An optical receiver, in particular, an optical received implemented with an APD is necessary to detect an optical signal with an intensity thereof nearly equal to a minimum condition defined in the optical system precisely. However, an APD inherently shows a dark current depending on a bias voltage applied thereto and a temperature thereof; accordingly, the dark current of the APD often hides the optical input power included in the photocurrent. Thus, an erroneous detection of the photocurrent sometimes causes the optical system in a failure.

A precise monitoring of the optical signal assumes a linear relation between the output current from the APD and the photocurrent due to the optical signal. However, as described, the dark current of the APD becomes substantial for an optical input with faint power. The methods disclosed in the prior arts above are hard to detect faint photocurrent with enough preciseness.

SUMMARY OF THE INVENTION

An aspect of the present invention relates to a method to monitor an optical signal input to an APD. The method includes steps of: (a) measuring dark current of the APD at several temperatures in advance to a practical operation of the APD; (b) measuring an output current of the APD by practically illuminating the APD with the optical signal at a measured temperature; (c) estimating a dark current of the APD at the measured temperature from the measured dark currents; and (d) subtracting the estimated dark current from the output current.

The method of the invention may measure the dark currents at least two different temperatures, calculate two constants from the two dark currents and two different temperatures based on a linear relation between the natural logarithm of the dark current and the temperature, and calculate the dark current at the measured temperature. The two dark currents measured in advance to the practical operating of the APD may be stored in a memory, and may be fetched at the step to calculate the dark current at the measured temperature. In another embodiment, the method may store two dark currents and two temperatures in the memory, and calculate two constants after the practical measurement of the optical signal at the measured temperature. Still another embodiment of the present invention may store dark currents and temperatures in the memory, and fetch one of dark currents corresponding to a temperature closest to the measured temperature.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS

Next, some embodiments according to the present invention will be described as referring to accompanying drawings. In the description of the drawings, the same numerals or the symbols will refer to the same elements without overlapping explanations.

Figure 1:
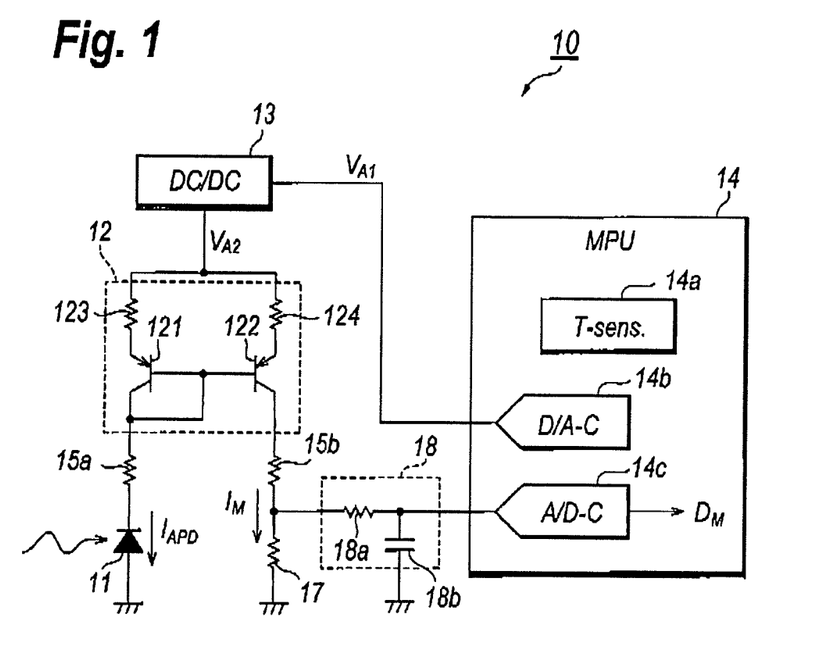
FIG. 1 a circuit diagram of an optical receiver according to the embodiment of the present invention.

FIG. 1 is a circuit diagram of an optical receiver according to the first embodiment of the present invention. The optical receiver 10 includes an APD 11, a current mirror circuit 12, a DC to DC converter (hereafter denoted as DC/DC-C) 13, and a micro-processing unit (hereafter denoted as MPU) 14.

The APD 11 receives an optical input and generates a photocurrent $I_{APD}$ corresponding to the optical input. The APD 11 is grounded in the anode thereof; while, receives a bias voltage $V_{APD}$ in the cathode thereof. The APD 11 may be made of primarily germanium (Ge).

The current mirror circuit 12, which is connected to the APD 11, may generate a monitored current $I_M$ proportional to the photocurrent $I_{APD}$. In the present embodiment shown in FIG. 1, the current mirror circuit 12 includes two pnp transistors, 121 and 122, with each of their bases being connected to the other, and two resistors, 123 and 124, each connected between the DC/DC-C 13 and the emitter. The collector of one of the transistors, 121 and 122, is connected to the cathode of the APD 11 through the resistor 15a, while, the collector of the other transistor 122 is connected to another resistor 17 through the resistor 15b. The other terminal of the resistor 17, which is often called as a monitor resistor, is grounded.

The MPU 14 may control the voltage output of the DC/DC-C 13 based on the temperature of the APD 11. Specifically, the MPU 14 includes the temperature sensor 14a, the digital-to-analog converter (hereafter denoted as D/A-C) 14b to control the DC/DC-C 13, and the analog-to-digital converter (hereafter denoted as A/D-C 14c) to monitor the magnitude of the monitored current $I_M$.

The temperature sensor 14a generates a sensed signal that reflects a temperature of the MPU 14 and an ambient temperature of the MPU 14. The present embodiment provides the temperature sensor 14a within the MPU 14; but the optical receiver 10 may install a temperature sensor independent of the MPU 14 to monitor the ambient temperature of the MPU 14.

The D/A-C 14b may output a control signal $VA_1$ to the DC/Dc-C 13. The DC/DC-C 13 converts the analog input $VA_1$ sent from the MPU 14 to another analog voltage $VA_2$ and sends it to the current mirror circuit 12. Generally, as the temperature senses by the temperature sensor 14a increase, the control signal $VA_1$ output from the MPU 14 becomes large.

The A/D-C 14c receives a voltage drop caused at the monitor resistor 17 caused by the monitor current $I_M$ through a low-pass filter (hereafter LPF) 18 constituted by a resistor 18a and a capacitor 18b. The A/D-C 14c may convert the voltage drop above described, which is filtered by the LPF 18, into a monitored value $D_M$ in the digital format.

The MPU may hold or store a relation of a dark current thereof against a temperature in a form of a table or an equation. The table, or the equation, may indicate a relation of a corrected photocurrent, which is subtracted by the dark current of the APD from the raw photocurrent $I_{APD}$). The MPU 14 may evaluate the photocurrent from the monitored value $D_M$ and the temperature sensed by the sensor 14a.

Next, details of operation of the optical receiver 10 will be described. The multiplication factor M of the APD 11 depends on the bias voltage $V_{APD}$, that is, the multiplication factor M increases as the bias voltage $V_{APD}$ increases. The photocurrent $I_{APD}$ output from the APD 11 is given by $$I_{APD} 0.805 \times \eta \times \lambda \times P_{IN} \times M, \quad (1)$$

Where $I_{APO}$, $\eta$, $\lambda$, $P_{IN}$, and M are the magnitude of the photocurrent, the quantum efficient of the APD, which means how many carriers are generated by single photon, the wavelength (μm) of the light incident to the APD, the optical power of the incident light, and the multiplication factor of the APD, which means how many carriers are generated from a carrier, respectively.

In equation (1) above, the quantum efficiency $\eta$ and the wavelength λ solely depend on a physical property of a semiconductor material constituting an active layer of the APD 11 and the architecture of the optical communication system. As a result, the output current $I_{APD}$ of the APD 11 becomes proportional to the optical input power $P_{IN}$ and the carrier multiplication factor M. The multiplication factor M may depend on the bias voltage $V_{APD}$, which is given by $$M = 1/\{1-(V_{APD}/V_B)^n\},$$

and $$V_B = V_{B0} \times (1+\beta \times \Delta T), \quad (2)$$

Where $V_{APD}$, $V_B$, n, β, $V_{B0}$, ΔT are the bias voltage applied to the APD; the breakdown voltage of the APD; a constant; the temperature co-efficient of the breakdown voltage, which is generally 0.1 to 0.3%/° C.; the reference of the breakdown voltage; and the temperature difference from a temperature where the reference of the breakdown voltage is given, respectively. From equation (2) above, the multiplication factor M depends on the breakdown voltage $V_B$, and the breakdown voltage $V_B$ depends on the temperature.

Figure 2:
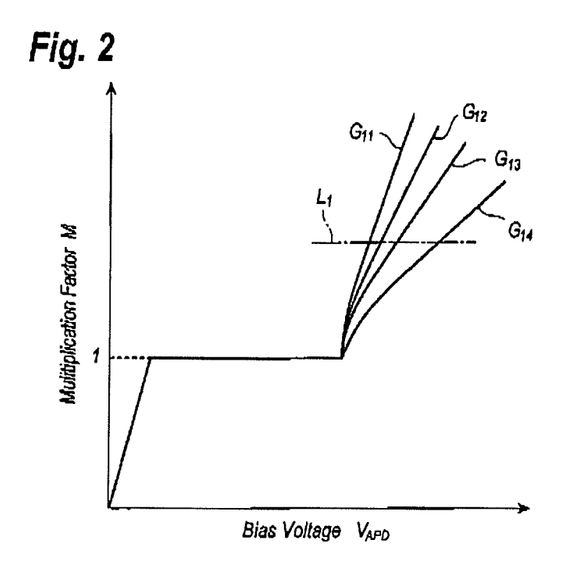
FIG. 2 exemplarily shows a relation of the carrier multiplication factor M of the APD against the bias voltage.

FIG. 2 shows a relation of the multiplication factor M against the bias voltage $V_{APD}$ in various temperatures. The behaviors $G_{11}$ to $G_{14}$ are measured at temperatures $T_1$ to $T_4$, respectively, where $T_1$ to $T_4$ are monotonically higher in this order, namely, $T_1<T_2<T_3<T_4$. As shown in FIG. 2, the multiplication factor M becomes proportional to the bias voltage $V_{APD}$ in a region where the bias voltage $V_{APD}$ exceeds the breakdown voltage $V_B$; but the proportional co-efficient, the slope of the relation, becomes greater as the temperature increases.

When we set the multiplication factor M constant independent of the temperature as shown in the horizontal line $L_1$ in FIG. 2, the output current $I_{APD}$ becomes independent of the temperature. That is, setting the ratio of the bias voltage $V_{APD}$ to the breakdown voltage $V_B$, $V_{APD}/V_B$, constant independent of the temperature in equation (2), the multiplication factor M becomes constant, which may be realized by varying the bias voltage $V_{APD}$ following the temperature variation of the breakdown voltage $V_B$.

The bias voltage $V_{A2}$ applied to the APD 11 in the receiver circuit shown in FIG. 1 is controlled by the signal $V_{A1}$ output from the D/A-C 14b of the MPU 14 through the DC/DC-C 13. The MPU 14 may concurrently sense the temperature by the temperature sensor 14a. Thus, the MPU 14 may set the bias voltage $V_{APD}$ for the APD 11 which keeps the multiplication factor in constant independent of the temperature by outputting the control signal $V_{A1}$ based on the temperature through the D/A-C 14b.

When an optical signal is input to the APD 11 under the bias condition above described, the APD 11 may generate the photocurrent $I_{APD}$, which may be reflected on the monitored current $I_M$ by the current mirror circuit 12. The voltage drop caused in the monitor resistor 17 by the monitored current $I_M$ is converted to a digital signal EN by the A/D-C 14c and detected by the MPU 14. Thus, the monitored signal $D_M$ may be given.

Figure 3:
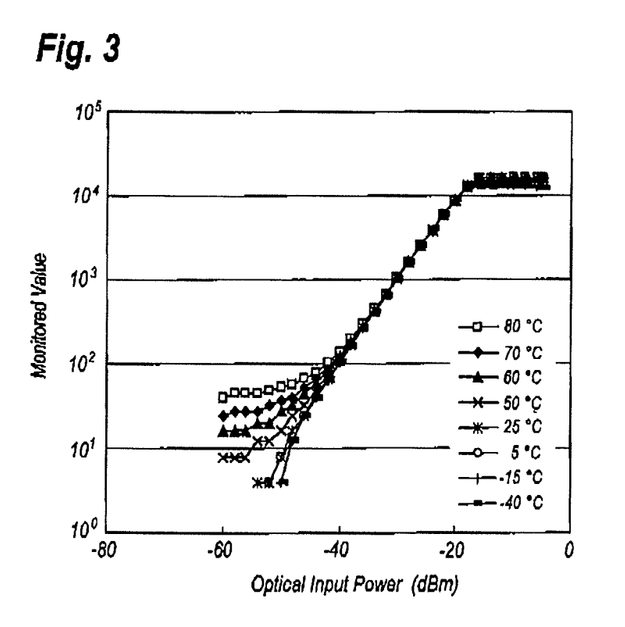
FIG. 3 shows a relation between the monitored value, which is direct output of the APD, and the optical input power.

FIG. 3 shows a relation of the monitored value $D_M$ against the optical input power under various temperatures from −40° C. to 80° C. In the measurement shown in FIG. 3, the A/P-C 14c had a resolution of 16 bits (65536 counts). Moreover, a saturation of the monitored signal $D_M$ for optical input power higher than −20 dBm is due to the saturated operation of circuits except for the APD 11, for instance, the current mirror circuit 12.

The monitored value for optical input power $P_{IN}$ greater than −36 dBm but less than −20 dBm show independent of temperatures, that is, a deviation of the value $D_M$ practically monitored through the A/D-C 14c from a true value proportional to the optical input power $P_{IN}$ is less than 2 dB; but the error appeared in the monitored value exceeds 2 dB for the optical input power less than −40 dBm, and expands further for lesser optical input power $P_{IN}$. This phenomenon is primarily due to the dark current of the APD 11. That is, the dark current, which is substantially independent of the optical input, drastically increases relative to the photocurrent as the optical input power becomes smaller. Accordingly, a substantial monitored value $D_M$ is left even when the optical input power $P_{IN}$ becomes smaller. Moreover, because the dark current of the APD 11 shows the temperature dependence, the monitored values $D_M$ for the smaller optical power shows a complex behavior. For instance, because the dark current increases as the temperature of the APD 11 increase, the monitored value $D_M$ shows a saturated behavior as shown in FIG. 3.

Thus, the deviation of the monitored value $D_M$ from the true value, which may be determined by extrapolating the linear relation between the optical input power and the monitored value $D_M$ at a medium range of the input power around −30 dBm, expands as the temperature of the APD 11 increases.

Figure 4:
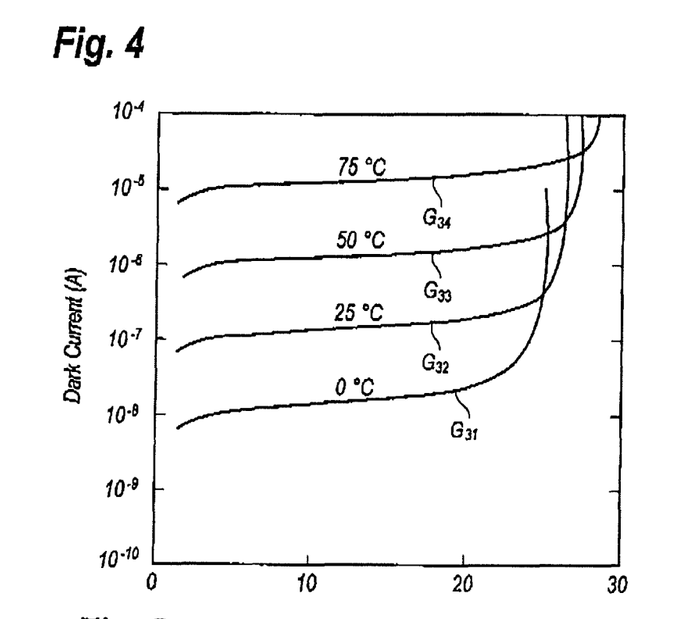
FIG. 4 exemplarily shows a characteristic of the dark current of the APD, which is primarily made of germanium (Ge) against the bias voltage and the temperature.

FIG. 4 shows typical behaviors of the dark current of the APD primarily made of germanium (Ge) in various temperatures. Behaviors, $G_{31}$ to $G_{34}$, in FIG. 4 each corresponds to the dark current measured at temperatures of 0° C. 25° C., 50° C., and 75° C., respectively. The dark current of the Ge-APD increases by about one digit for the increase of the temperature of 25° C. The dark current $I_D$ of the APD 11 is generally given by:

$$I_D = A \times \exp(B \times T) + C, \qquad (3)$$

where A to C are constant, and T is the absolute temperature of the APD 11.

The output $I_{APD}$ of the APD 11 is a sum of the photocurrent $I_{OP}$ and the dark current $I_D$, which is denoted as:

$$T_{APD} = I_{OP} + I_D = I_{OP} + A \times \exp(B \times T) + C. \qquad (4)$$

Determining constants, A to C, in equation (4) above, the true photocurrent IOP may be obtained from the subtraction of the dark current $I_D$ from the output $I_{APD}$ of the APD 11, where the dark current $I_D$ is estimated from the temperature of the APD 11 when the output $I_{APD}$ is measured.

Figure 5:
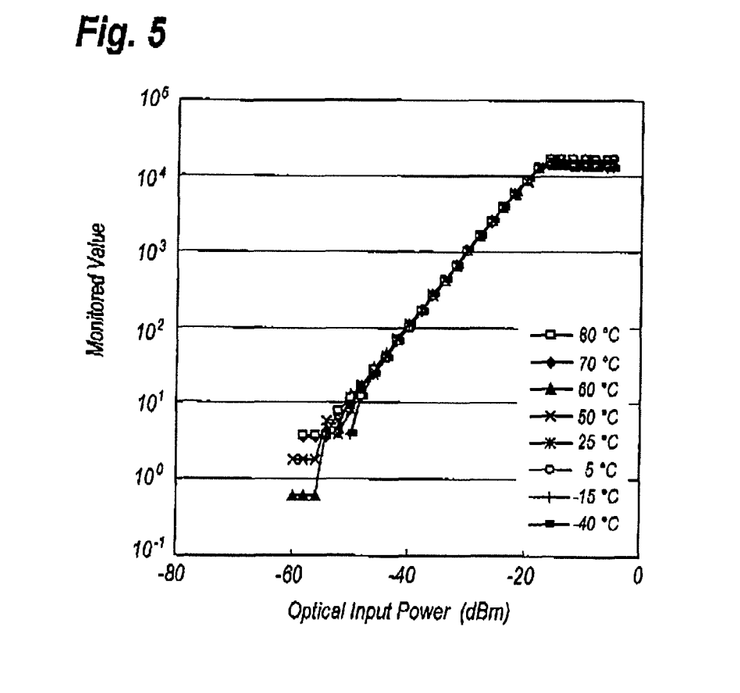
FIG. 5 shows a relation between the corrected monitored value of the APD and the optical input power.
Figure 6:
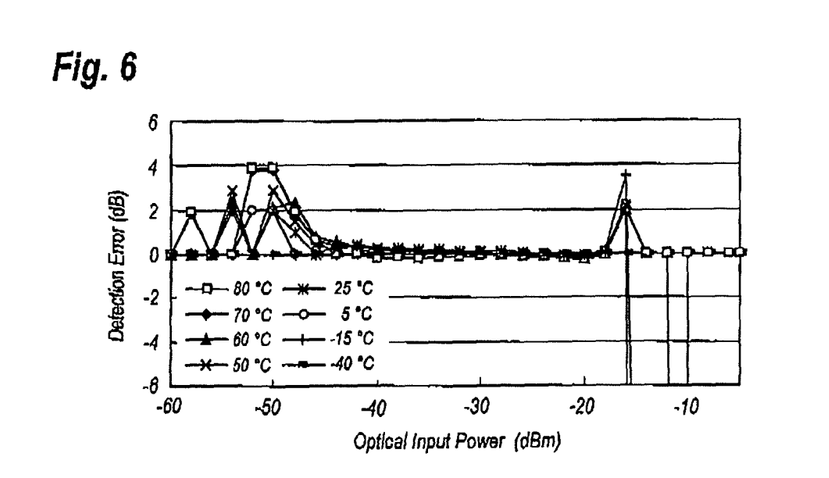
FIG. 6 emphasizes a difference between the directly monitored value and the corrected monitored value of the APD, which corresponds to the detection error, and the optical input power.

FIG. 5 shows a relation of the corrected monitored value and the optical input power $P_{IN}$ where the corrected monitored value is subtracted from the practical monitored value $D_M$ by the dark current $I_D$. FIG. 6 shows behaviors of the detection error, which is the difference between the corrected monitored value and a virtual point given by the extrapolation of the linear relation shown in FIG. 5, against the optical input power $P_{IN}$. FIGS. 5 and 6 include behaviors corresponding to temperatures from −40° C. to 80° C.

The subtraction of the dark current ID from the practical monitored value $D_M$ may correct the monitored value so as to close to the true value further compared to those shown in FIG. 3. As shown in FIG. 6, the detection error within 2 dB may expand to the optical input power of −46 dBm. The increase of the detection error at further smaller optical input power in FIG. 6 is due to the quantization error of the A/D-C 14c. Specifically, the monitored value $D_M$ for the optical input power $P_{IN}$ smaller than −46 dBm is less than 10 counts as shown in FIG. 5, the quantization error of ±1 count is enhanced. Another monitoring algorithm compressing the quantization error, for instance, increasing the resolution of the A/D-C 14c equivalently by changing the conversion range thereof, may further enhance the monitoring linearity for smaller range of the optical input power $P_{IN}$.

Specifically, setting the bias voltage $V_{APD}$ of the APD 11 in the optical receiver 10 such that the multiplication factor M becomes 7 for the optical input power $P_{IN}$ of −46 dBm, the output $I_{APD}$ from the APD 11 becomes 176 nA, which is a sum of the component proportional to the optical input power $P_{IN}$ and the dark current $I_D$. Setting further the current ratio of the source current $I_{APD}$ to the mirror current $I_M$ to be $I_{APD}:I_N=3:1$, the monitored current $I_M$ becomes 58.6 nA. Assuming the resistance of the monitored resistor 17 is 56 kΩ), the monitored value $V_H$ becomes 3.28 mV (=58.6 nA×56 kΩ).

When we use the A/D-C 14c with the resolution of 14 bits and the input range of 0 to 2.5V, one bit corresponds to $2.5/2^{14}$ 0.15 mV. Accordingly, the monitored signal of 3.28 mV corresponding to the optical input power of −46 dBm becomes 3.28/0.15=21.8 counts, which may be converted to a digital value of 21 or 22. Then, the quantization error becomes $\log_2(22/21)$=0.202 dB, which is ignorable compared to the allowed error of ±3 dB. Thus, the optical input power of −46 dBm may be monitored with an enough resolution even the quantization error is taken into account.

When we use the APD made of primarily InGaAs, the dark current becomes around 100 nA at the temperature of 90° C. under a condition where the multiplication factor M is set to be 7, which takes substantial part of the output $I_{APD}$ of 176 nA from the APD 11 for the optical input power $P_{IN}$ of −46 dBm. The optical receiver 10 shown in FIG. 1 may compensate the output $I_{APD}$ of the APD 11 by the MPU 14, that is, the monitored value $D_M$ corresponding to the mirror current $I_M$ is subscribed by the dark current in the MPU 14. The DC/DC-C 13 is preferable to be compensated in the temperature dependence thereof so as to set the multiplication factor M of the APD 11 to be constant independent of the temperature.

Next, an algorithm to correct the output of the APD 11 will be further specifically described.

First Algorithm

Figure 7:
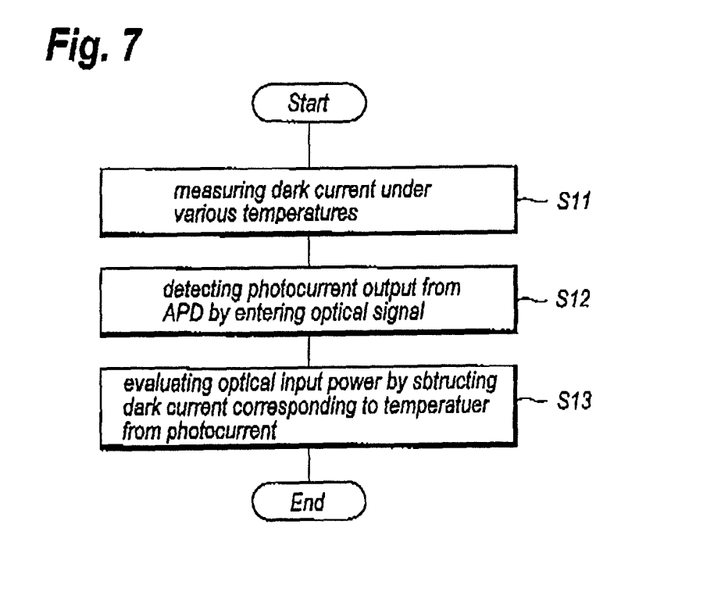
FIG. 7 is a flow chart for correcting the monitored value of the APD according to the first embodiment of the present invention.

FIG. 7 is a flowchart showing an algorithm to correct the output of the APD according to the first method of the present invention. The first method includes three steps, S11 to S13. The first step S11 measures the dark current under various temperatures at a condition where the bias voltage is supplied to the APD 11 without any optical input entering therein. That is, the APD 11 generates only the dark current and the monitored current $I_M$ is detected through the monitoring resistor 17 and the A/D-C 14c. The data corresponding to the monitored dark current are stored in the memory within the MPU 14.

The second step S12 measures the output $I_{APD}$ of the APD 11 under the illuminated condition. Specifically, illuminating the APD 11 by the optical signal, the MPU 14 receives the practical monitored value $D_M$ through the current mirror circuit 12 and the A/D-C 14c. The MPU 14 concurrently measures the temperature by the temperature sensor 14a.

The third step S13 first calculates the dark current at the sensed temperature and the data stored in the memory, and secondly, subtracts the thus calculated dark current from the monitored value $D_M$. Then the photocurrent truly corresponding to the optical input power may be obtained.

Second Algorithm

The dark current $I_D$ caused by the APD 11 is given by previous equation (3). Moreover, when we set the bias voltage $V_{APD}$ of the APD such that the multiplication factor M thereof becomes about 7, the constant C relating to the shot noise becomes ignorable for under such bias condition. Then, the dark current ID is denoted as:

$$I_D - A \times \exp(B \times T). \qquad (5)$$

Moreover, taking the natural logarithm of equation (5), we obtain;

$$\log_e(I_D) = B \times T + \log_e(A). \qquad (6)$$

Figure 8:
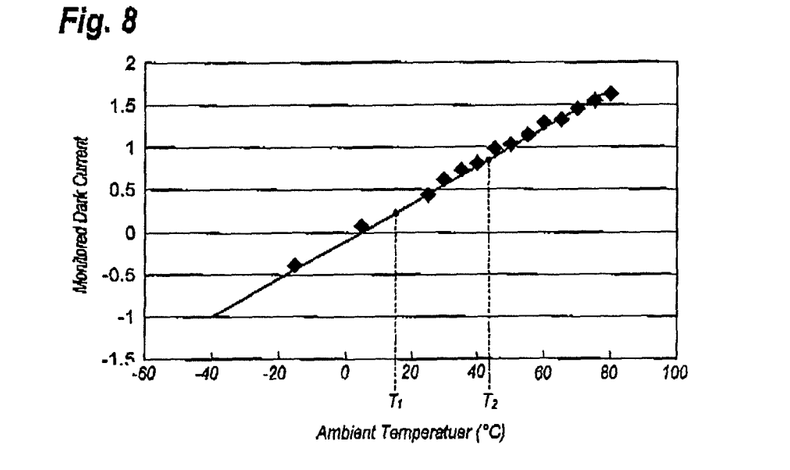
FIG. 8 shows a linear relation of the dark current of the APD against the ambient temperature.

Equation (6) has a linear dependence of T. Accordingly, measuring the dark currents, $I_{D1}$ and $I_{D2}$ at two different temperatures, $T_1$ and $T_2$, we can estimate two constants, A and B. That is, when we pot the natural logarithm of the dark current against the temperature in linear scale, one liner relating may be obtained with the slope thereof corresponding to the constant B and the Y-intersect corresponding to the constant A. FIG. 8 shows the linear relation between the natural logarithm of the dark current $I_D$ and the temperature T in the linear scale. The line appeared in FIG. 8, which is obtained by the measurement at two distinct temperatures, may give constants, A and B. Moreover, the line thus obtained may approximate dark currents practically measured with a reasonable accuracy.

Figure 9:
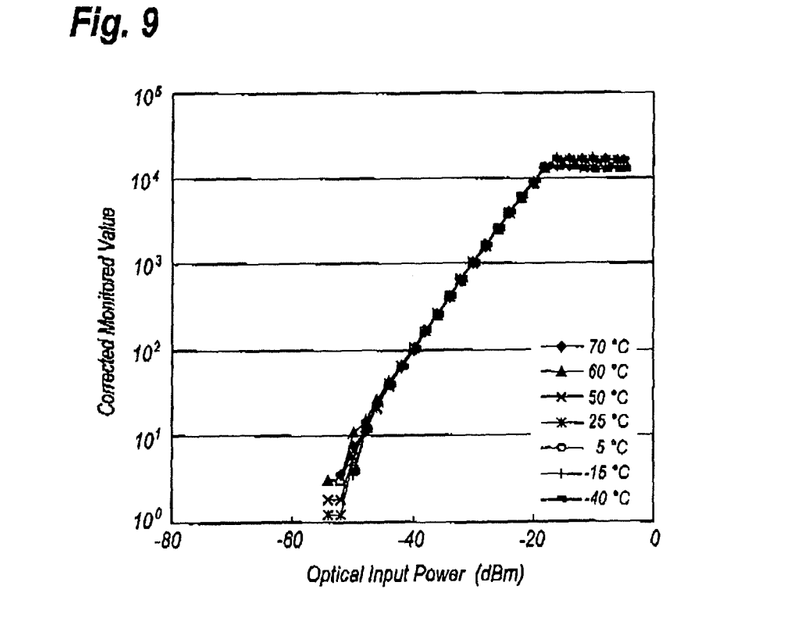
FIG. 9 shows a relation between the corrected monitored value of the APD, which is corrected according to the second embodiment of the invention, and the optical input power.
Figure 10:
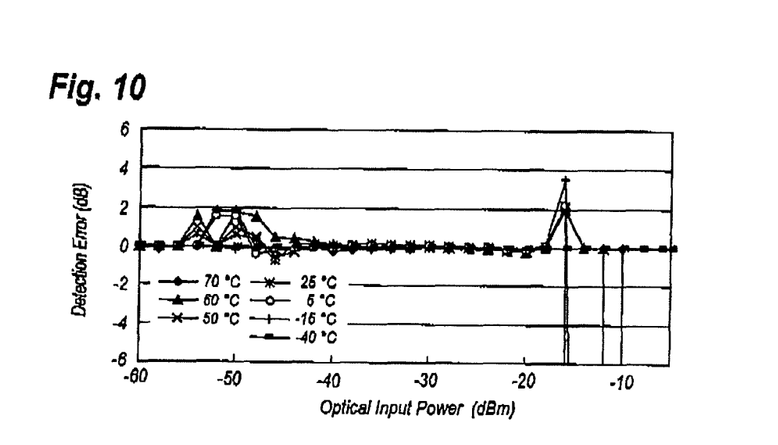
FIG. 10 emphasizes a difference between the corrected monitored value of the APD, which is corrected according to the second embodiment of the invention, and the optical input power.

FIG. 9 shows a relation between the corrected monitored value and the optical input power. The correction is carried out by the method following the second embodiment of the invention, that is, (1) measuring two dark currents at different temperatures in advance to the practical operation of the APD, (2) evaluating two constants, A and B, to obtain the linear relation between the dark current and the temperature, and (3) practically monitoring the optical input by the APD at a temperature and subtracting the dark current at this temperature, which is calculated by the linear relation measure in advance, from the monitored value. FIG. 10 emphasizes a difference between the corrected monitored value and the optical input power. FIGS. 9 and 10 include results taken at temperatures from −40° C. to 70° C.

As shown in FIGS. 9 and 10, the corrected monitored values show a unique relation independent of the temperature against the optical input power $P_{IN}$ even when the optical input power $P_{IN}$ is quite small of −46 dBm. The corrected monitored value slightly scatters for the optical input power less than −46 dBm due to the quantization error of the A/D-C 14c.

Thus, FIG. 9 is a result according to the second embodiment of the invention, where (1) the dark current $I_D$ of the APD is measured in advance at two different temperatures, $T_1$ and $T_2$; (2) two constants, A and B, are evaluated from these two dark current and temperatures; (3) the dark current of the APD at a temperature where the APD practically receives the optical input is estimated; and (4) the output of the APD is corrected so as to subtract the dark current thus estimated from the practical output of the APD. Comparing the result of FIG. 9 with those of FIG. 5, two cases agree quite well and the method according to the second embodiment seems to be enough effective.

Figure 11:
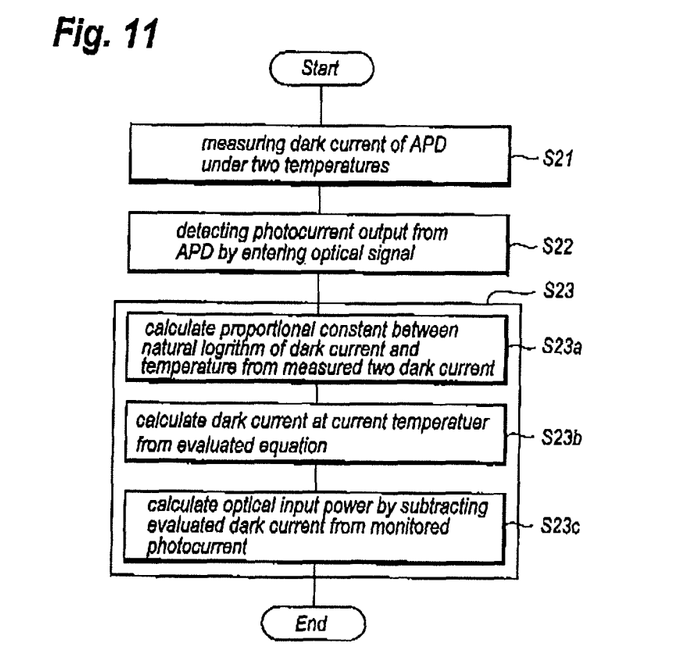
FIG. 11 is a flowchart for correcting the monitored value of the APD according to the second embodiment of the invention.

FIG. 11 is a flow chart specifically showing the second embodiment of the present invention. The flow chart shown in FIG. 11 includes steps of S21, S22, and S23. Step S21 measures the dark current at two different temperatures. A technique to measure the dark current is same as those described in the first embodiment. Step S22 measures the output $I_{APD}$ of the APD practically illuminated with an optical input. The same technique with those of the first embodiment may be carried out.

Step S23 subtracts the dark current, which is estimated from the two dark current measured at step S21, from the output $I_{APD}$ of the APD. Specifically, the MPU 14 first fetches the dark currents from the memory, secondly evaluates two constants, $\log_e$ (A) and B in equation (6) from the natural logarithm of two measured dark currents, $\log_e (I_D)|_{T1}$ and $\log_e (I_D)|_{T2}$ and two temperatures, $T_1$ and $T_2$, (step S23a); estimates the dark current $I_D$ at the temperature under which the optical input is measured by the linear relation of equation (6), (step S23b); and subtracts thus estimated dark current $I_D$ from the output $I_{APD}$ of the APD (step S23c).

The method according to the invention measures the dark current at temperatures at step S11 or S21, which enables to estimate or calculate the practical dark current at various temperatures at which the dark current is not practically measured. Moreover, step S13, or S23, subtracts thus measured or estimated dark current from the monitored value $D_M$ of the APD measured at step S12, or S22. Accordingly, the optical receiver shown in FIG. 1 may precisely monitor the optical output even when the magnitude thereof is faint.

In the method according to the second embodiment, step S23 calculates the constants, $\log_e$ (A) and B, as shown in FIG. 11. However, to step S21 may calculate these two constant just after the measurement of two dark currents. The MPU 14 may store these constants in the memory at step S21; and fetches them from the memory at step S23. Moreover, in the method according to the first embodiment, step S11 stores the measured dark currents, which corresponding to respective temperatures, and step s23 may fetch one of dark currents corresponding to the temperature closest to the temperature under which the optical input power is practically measured by the APD 11.

In view of the many possible embodiments, it will be recognized that the illustrated embodiments include only examples and should not be taken as a limitation on the scope of the invention. Rather, the invention is defined by the following claims.

What is claimed is:

1. A method to monitor an optical signal input to an avalanche photodiode, (APD), comprising steps of:
   (a) measuring dark currents of said avalanche photodiode at several temperatures under a condition where a bias voltage supplied to said APD is a value at which said APD shows a multiplication factor greater than unity;
   (b) measuring an output current of said avalanche photodiode by illuminating said avalanche photodiode with said optical signal at a measured temperature;
   (c) independently of said bias voltage, estimating a dark current of said avalanche photodiode at said measured temperature from said measured dark currents; and
   (d) subtracting said estimated dark current from said output current.

2. The method of claim 1,
   wherein said step (a) includes steps of,
   (a1) measuring at least two dark currents at two different temperatures,
   (a2) calculating two constants from said at least two dark currents and said two temperatures based on a linear relation between a natural logarithm of dark current and temperature, said linear relation being:

$$\log_e(I_D) = \log_e(A) + B \times T,$$

where $I_D$ is dark current, T is temperature, and A and B are constants, and
   (a3) storing said two constants in a memory, and
   wherein said step (c) includes steps of,
   (c1) fetching said two constants from said memory, and
   (c2) calculating said estimated dark current from said two constants and said measured temperature.

3. The method of claim 1,
   wherein said step (a) includes a step of,
   (a1) measuring at least two dark currents at two temperatures, respectively, and
   wherein said step (c) includes steps of
   (c1) calculating two constants from said at least two dark currents and said two temperatures by taking a natural logarithm of said measured two dark currents and said two temperatures based on an equation of:

$$\log_e(I_D) = \log_e(A) + B \times T.$$

where $I_D$ is dark current, T is temperature, and A and B are said two constants, and (c2) calculating said estimated dark current from said two constants and said measured temperature.

4. The method of claim 3, wherein said step (a) further includes a step of after said step (a1), storing values of said at least two dark currents in a memory; and wherein said step (c) further includes a step of before said step (c1), fetching said at least two dark current values from said memory.

5. The method of claim 1, wherein said step (a) includes a step of, (a1) storing values of said measured dark currents in a memory, and wherein said step (c) includes a step of, (c1) fetching, from said memory, one of said measured dark values at a temperature closest to said measured temperature.

* * * * *